United States Patent
Ould-Brahim

(10) Patent No.: US 8,117,338 B2
(45) Date of Patent: Feb. 14, 2012

(54) BORDER GATEWAY PROTOCOL PROCEDURES FOR MULTI-PROTOCOL LABEL SWITCHING AND LAYER-2 VIRTUAL PRIVATE NETWORKS USING ETHERNET-BASED TUNNELS

(75) Inventor: Hamid Ould-Brahim, Kanata (CA)

(73) Assignee: Rockstar Bidco, LP, New York, NY (US)

( * ) Notice: Subject to any disclaimer, the term of this patent is extended or adjusted under 35 U.S.C. 154(b) by 488 days.

(21) Appl. No.: 12/015,632

(22) Filed: Jan. 17, 2008

(65) Prior Publication Data

US 2008/0170578 A1 Jul. 17, 2008

Related U.S. Application Data

(60) Provisional application No. 60/880,779, filed on Jan. 17, 2007.

(51) Int. Cl.
*G06F 15/173* (2006.01)
*H04L 12/28* (2006.01)

(52) U.S. Cl. ........................................ 709/242; 370/351
(58) Field of Classification Search .................. 709/242; 370/351
See application file for complete search history.

(56) References Cited

U.S. PATENT DOCUMENTS

| | | |
|---|---|---|
| 2003/0112755 A1 | 6/2003 | McDysan |
| 2004/0025054 A1 | 2/2004 | Xue |
| 2004/0076165 A1 | 4/2004 | Jean-Francois et al. |
| 2005/0053079 A1 | 3/2005 | Havala |
| 2005/0097203 A1* | 5/2005 | Unbehagen et al. .......... 709/223 |
| 2006/0002401 A1 | 1/2006 | Mukherjee et al. |
| 2007/0286204 A1 | 12/2007 | Ould-Brahim |

FOREIGN PATENT DOCUMENTS

| | | |
|---|---|---|
| EP | 1513296 A1 | 9/2005 |
| WO | 03/079614 A1 | 9/2003 |

OTHER PUBLICATIONS

Abdelhalim, Ahmed; IP/MPLS-Based VPNs: layer-3 vs. Layer-2; Foundry Networks; 2002; San Jose, CA.
Bates et al.; Multiprotocol Extensions for BGP-4; Jun. 2000; The Internet Society; <<http://tools.ietf.org/rfc/rfc2858.txt>>.
Chandra et al.; BGP Communities Attribute; Aug. 1996; Network Working Group.

(Continued)

*Primary Examiner* — Philip Chea
(74) *Attorney, Agent, or Firm* — Guerin & Rodriguez, LLP

(57) ABSTRACT

Described are a network device and method for distributing routing information for a virtual private network (VPN) application through a packet-switched network (PSN) from a first provider edge (PE) router to a second provider edge (PE) router. An Ethernet switched path (e.g., a Provider Backbone Transport (PBT) tunnel) is established between the first and second PE routers. The first PE router is at a source end of the Ethernet switched path and the second PE router is at a destination end of the Ethernet switched path. A BGP (Border Gateway Protocol) message is sent from the first PE router to the second PE router. The BGP message contains routing information for a VPN route in a VPN supported by the PSN. An association between the VPN route in the VPN and the Ethernet switched path is determined from the routing information in the BGP message.

24 Claims, 5 Drawing Sheets

OTHER PUBLICATIONS

Kompella et al.; Virtual Private LAN Service (VPLS) Using BGP for Auto-discovery and Signaling; Jun. 21, 2006; <<The Internet Society; http://tools.ietf.org/draft-ietf-l2vpn-vpls-bgp-08>>.

Lasserre et al.; Virtual Private LAN Service Using LDP; Jun. 2008; The Internet Society; <<http://tools.ietf.org/html/draft-ietf-12vpn-vpls-ldp-09>>.

Rekhter et al.; A Border Gateway Protocol 4 (BGP-4); Mar. 1995; Network Working Group.

Balus et al.; VPLS Extensions for Provider Backbone Bridging; Jul. 8, 2007; The IETF Trust.

Rosen et al.; BGP/MPLS IP Virtual Private Networks (VPNs); Feb. 2006; The Internet Society;<<http://tools.ietf.org/html/rfc4364>>.

Rosen et al.; Provisioning, Autodiscovery, and Signaling in L2VPNs; May 3, 2006; The Internet Society; <<http://tools.ietf.org/html/draft-ietf-12vpn-signaling-08>>.

Sangli et al.; BGP Extended Communities Attribute; Feb. 2006; The Internet Society; <<http://tools.ietf.org/rfc/rfc4360.txt>>.

Nortel; Provider Backbone Bridges Bring massive Service Scalability to Ethernet; 2007; Nortel Networks.

Metro Ethernet Deployment with Siemens PBB-TE: Surpass hiD 6600; Mar. 13, 2007. Siemens.

International Search Report for international Application No. PCT/US2008/51261 dated Apr. 18, 2008; 2 pages.

Office Action in Chinese Application No. 200880002418.9, dated Nov. 12, 2010 (14 pages).

Office Action in European Application No. 08705973.9, dated Jan. 13, 2011 (4 pages).

Kompella, Layer 2 VPNs Over Tunnels, Network Working Group, draft-kompella-l2vpn-l2vpn-01.txt, Jan. 2006, Internet Draft.

Rosen and Rekhter, BGP/MPLS IP Virtual Private Networks (VPNs), Network Working Group, Request for Comments: 4364, Feb. 2006.

Search Report and Written Opinion in Counterpart Foreign Application No. 0870597.3, dated Feb. 22, 2010, (8 pages).

\* cited by examiner

BORDER GATEWAY PROTOCOL PROCEDURES FOR MULTI-PROTOCOL LABEL SWITCHING AND LAYER-2 VIRTUAL PRIVATE NETWORKS USING ETHERNET-BASED TUNNELS

RELATED APPLICATION

This utility application claims the benefit of U.S. Provisional Patent Application No. 60/880,779, filed on Jan. 17, 2007, the entirety of which provisional application is incorporated by reference herein.

FIELD OF THE INVENTION

The invention relates generally to virtual private networks (VPNs). More particularly, the invention relates to Border Gateway Protocol (BGP) procedures for distributing VPN route information across a packet-switched network (PSN) in order to configure the PSN for routing VPN data traffic through Ethernet-based tunnels.

BACKGROUND

Virtual private networks, or VPNs, are becoming increasingly popular as a cost-effective means for conducting voice and data communications between, for example, corporate data centers, remote offices, mobile employees, customers, suppliers, and business partners. In general, a VPN is a private network configured within a public network, such as a service provider's network or the Internet. The VPN of a given customer appears privately dedicated to that customer, when in actuality the customer's VPN shares the same physical backbone with the VPNs of many other customers.

Increasingly, service providers are using MPLS (Multi-protocol Label Switching) tunneling to implement VPNs across their packet-switched networks. Two major types of IP/MPLS-based VPNs have arisen: (1) layer-3 VPN services, referred to as L3VPNs; and (2) layer-2 VPN services, referred to as L2VPNs. A standard for L3VPNs is described in Internet Engineering Task Force ("IETF") Request for Comments ("RFC") 4364, titled "BGP/MPLS IP Virtual Private Networks (VPNs)", the entirety of which is hereby incorporated by reference herein. Implementations of L2VPNs are described in RFC 4761, titled "Virtual Private LAN Service (VPLS) Using BGP for Auto-Discovery and Signaling", in RFC 4762, titled "Virtual Private LAN Service (VPLS) Using Label Distribution Protocol (LDP) Signaling", and in IETF draft-ietf-l2vpn-signaling-08.txt, titled "Provisioning, Auto-discovery, and Signaling in L2VPNs", the entirety of which are hereby incorporated by reference herein.

Implementing a MPLS-based VPN generally requires the distribution of certain routing information between provide edge (PE) routers of the service provider's network. A commonly used inter-domain routing protocol for exchanging such routing information is the Border Gateway Protocol, or BGP. For example, using BGP messages, PE routers exchange VPN routes (layer-3) with customer edge (CE) routers and with other PE routers in the service provider network. For layer-2 VPNs, PE routers use BGP update messages to exchange VPLS (Virtual Private LAN Service) membership and demultiplexor information with other PE routers in the same VPLS.

With the advent of connection-oriented forwarding technologies such as Provider Backbone Transport (PBT), native Ethernet is rapidly emerging as a viable packet-switched network technology. Consequently, Ethernet is becoming more widely used, particularly in metro-area networks and wide-area networks. With PBT, service providers are able to establish point-to-point and point-to-multipoint Ethernet tunnels and to specify paths that service traffic will take through their Ethernet networks. Having such capabilities, service providers are desirous of supporting layer-2 and layer-3 BGP-VPN applications over their Ethernet networks. Notwithstanding, control plane mechanisms are needed to configure the packet-switched network for routing data packets of layer-2 and layer-3 BGP-VPN applications through Ethernet-based tunnels.

SUMMARY

In one aspect, the invention features a method of distributing routing information for a virtual private network (VPN) application through a packet-switched network (PSN) from a first provider edge (PE) router to a second provider edge (PE) router. An Ethernet switched path is established between the first and second PE routers. The first PE router is at a source end of the Ethernet switched path and the second PE router is at a destination end of the Ethernet switched path. A BGP (Border Gateway Protocol) message is sent from the first PE router to the second PE router. The BGP message contains routing information for a VPN route in a VPN supported by the PSN. From the routing information in the BGP message is determined an association between the VPN route in the VPN and the Ethernet switched path.

In another aspect, the invention features a packet-switched network comprising first and second provider edge (PE) routers in communication with each other over an Ethernet switched path. Each PE router runs a Border Gateway Protocol (BGP) as a discovery mechanism in support of a virtual private network (VPN) application to be transported over the Ethernet switched path. The first PE router transmits routing information to the second PE router in a BGP message. The second PE router determines from the routing information in the BGP message an association between a VPN route for the VPN application and the Ethernet switched path.

In still another aspect, the invention features a border gateway protocol (BGP) network device in communication with a BGP peer over a packet-switched network through an Ethernet switched path. The BGP network device includes memory storing routing information for supporting a virtual private network (VPN) application over the Ethernet switched path and program code with computer-readable instructions for sending BGP messages with the routing information to the BGP peer. A processor executes the program code to generate a BGP message with the routing information for transmitting to the BGP peer. The routing information in the BGP message provides an association between a VPN route for the VPN application and the Ethernet switched path.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Communications networks constructed in accordance with the invention use BGP as an auto-discovery mechanism to support the delivery of VPN services across packet-switched networks through Ethernet-based tunnels. Auto-discovery is a mechanism by which a given provider edge PE router finds other PE routers participating in the same VPN or VPLS. Examples of supported VPN applications that use BGP as an auto-discovery mechanism—referred to herein as BGP-VPN applications—include, but are not limited to, BGP/MPLS IP VPNs (RFC 2547, RFC 4364, VPLS-BGP, VPLS-LDP (Label Distribution Protocol) using BGP, L2VPN using BGP, and multi-segment pseudowire using BGP. An Ethernet-based tunnel can be of any type; that is, the tunnel can be any point-to-point or point-to-multipoint tunnel based on, for example, PBT, PBB (Provider Backbone Bridge), T-MPLS (Transport MPLS), PVT (Provider VLAN Transport), and VXC (VLAN Cross Connection).

In brief overview, PE routers of a service provider (SP) network exchange BGP messages to advertise VPN routes through the SP network and to associate such routes with Ethernet tunnels. In particular, certain fields of these BGP messages carry routing information that enables the PE routers to associate a particular VPN with a particular Ethernet tunnel. In one embodiment, the PE routers determine this association directly from the routing information carried in the BGP messages. In another embodiment, the routing information in the BGP messages enables an indirect association between an Ethernet tunnel and a VPN route. After the PE routers directly or indirectly establish an association between an Ethernet tunnel and a particular VPN, the frames of customer VPN traffic are encapsulated with an Ethernet header for transmission through the Ethernet tunnel.

Figure 1:
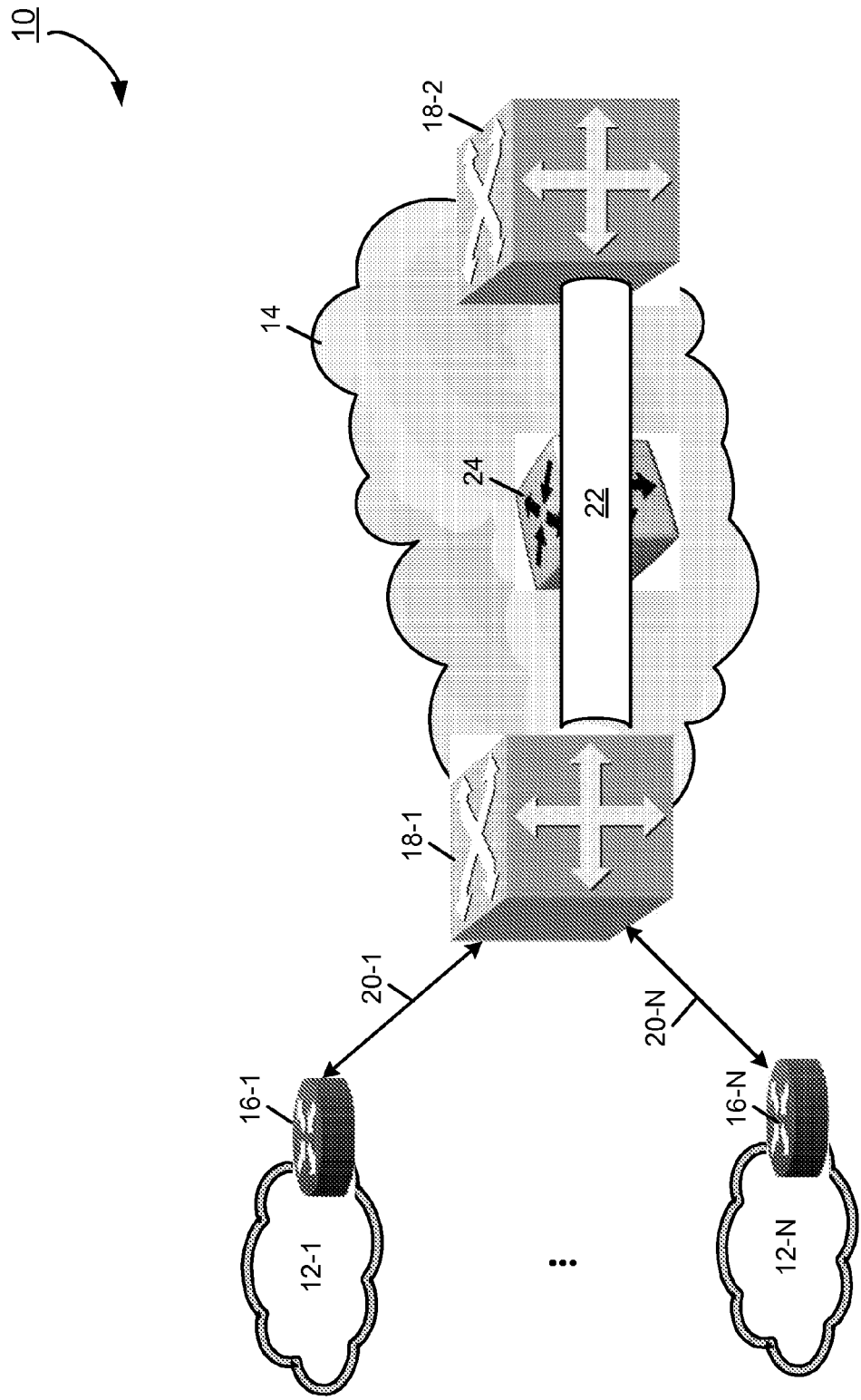
FIG. 1 is a block diagram representation of a simplified embodiment of a communications network that includes provider edge (PE) routers configured to enable layer-2 and layer-3 BGP-VPN applications to send data traffic across a packet-switched network through Ethernet-based tunnels.

FIG. 1 shows an embodiment of an exemplary communications network 10 in which the principles of the invention may be practiced. The communications network 10 includes one or more customer sites or networks 12-1, 12-n (generally, 12) in communication with a packet-switched network (PSN) 14. Each customer site 12-1, 12-n includes a customer edge (CE) router 16-1, 16-n (generally, 16), respectively.

The PSN 14 corresponds to a network domain managed by a service provider (or by multiple service providers that contract to support a VPN service). The PSN 14 includes first and second provider edge (PE) routers 18-1, 18-2 (generally, 18). In general, a PE router 18 is a network element—also referred to as a device or as a node—that communicates with one or more CE routers 16. For example, PE router 18-1 is in communication with CE router 16-1 and CE router 16-n. Typically, the PSN 14 has more PE routers 18 than those shown. For purposes of illustrating the principles of the invention, the PE router 18-1 is primarily referred to as ingress PE router 18-1, and the PE router 18-2 as egress PE router 18-2.

Customers (i.e., owners of the customer sites 12) obtain VPN services from the service provider. Examples of customers include, but are not limited to, Internet Service Providers (ISP), an enterprise, a group of enterprises, an application service provider, and other service providers of VPN services. BGP-VPN applications can originate or terminate (or both) at the CE sites 12. The BGP-VPN applications supported by the customer site 12-1 can be the same as or different from those supported by the customer site 12-n. In addition, a given customer site 12 can be in more than one VPN (intranet and one or more extranets).

Each CE router 16-1, 16-n is in communication with the PE 18-1 over respective links (i.e., attachment circuits) 20-1, 20-n. Generally, an attachment circuit is part of a user-to-network interface between a PE router 18 and a CE router 16 and comprises a physical or logical link configured for the particular technology of the network service. Example embodiments of attachment circuits include, but are not limited to, a frame relay DLCI (data link connection identifier), an ATM VPI/VCI (virtual path identifier/virtual channel identifier), an Ethernet port, a VLAN (virtual LAN), an HDLC (high-level data link control) link, a PPP (point-to-point protocol) connection on a physical interface, a PPP session from an L2TP (Layer 2 tunneling protocol) tunnel, and an MPLS LSP (label switch path).

In FIG. 1, the ingress PE router 18-1 is in communication with the egress PE router 18-2 across the PSN 14 through an Ethernet-based tunnel 22, also referred to as an Ethernet switched path (ESP). In general, an ESP is a point-to-point or a point-to-multipoint Ethernet connection established between Ethernet-capable network elements. The ESP 22 may be established through manual or automatic provisioning (e.g., through a control plane, such as GMPLS (Generalized MPLS)). Accordingly, the type of the ESP 22 depends upon the particular technology used to establish the ESP. For example, when GMPLS is used to establish the ESP 22, the ESP 22 is an Ethernet label switch path (E-LSP). As other examples, when the PSN 14 is employing PBT technology, the ESP 22 is a PBT trunk, and when the PSN 14 is employing PBB (802.1ah) technology, the ESP 22 is a PBB (802.1ah) trunk. In addition, the PE routers 18 are adapted to support communications over the particular type of ESP 22. For example, when the ESP is a PBT trunk, the PE routers are PBT-enabled. Various intermediate routers (called provider-only or P-nodes) in the ESP 22 between the PE routers 18, such as P-node 24, are also, for example, PBT-enabled for routing packets through the ESP 22.

Before data associated with a BGP-VPN application can traverse the PSN 14 through the ESP 22, the PE routers 18 need to learn the route belonging to the given VPN. In one embodiment, the service provider uses the Multi-protocol Border Gateway Protocol (MP-BGP), described in RFC 2858, to cause distribution of VPN routing information to the PE routers 18 that are in the VPN. Accordingly, each such PE router 18 is a MP-BGP network device that runs MP-BGP.

In brief, MP-BGP network devices establish a reliable transport protocol connection with each other, exchange messages to open a BGP session, and then exchange their routing information (i.e., routing table). In general, this routing information includes the complete route to each network destination reachable from a BGP network device. Each route comprises a destination address and information that describes the path to the address destination. Throughout an established BGP session, MP-BGP network devices maintain their routing information by exchanging incremental updates, such as the advertisement of new routes or withdrawals of existing routes. MP-BGP network devices use BGP update messages to advertise routes to other PE routers. When used in support of BGP-VPN applications, these BGP update messages advertise VPN routes.

A Multi-protocol BGP update message includes, among other fields, a message header, a Path Attributes field, and a Multi-protocol attribute. The Multiprotocol attribute include a field called Network Layer Reachability Information (NLRI) field. Another field of the Multi-protocol attribute is the BGP next hop (note that the BGP next hop field can also be carried outside the Multiprotocol attribute). The NLRI field provides the address field of each feasible route being advertised in the BGP update message. In addition, the Multi-protocol attribute includes an Address Family Identifier (AFI) field and a Subsequent Address Family Identifier (SAFI) field. In general, the AFI field carries the identity of the network layer protocol associated with the network address that follows, and the SAFI field provides additional information about the type of Network Layer Reachability information carried in the attribute.

Because a customer site can belong to more than one VPN, customer VPNs can have overlapping IP addresses. To avoid the situation of a given PE router receiving BGP update messages with overlapping routes belonging to different VPNs, MP-BGP includes a route distinguisher (RD) in its advertisements of a VPN route. Thus, a recipient PE router is sure to be able to distinguish among VPN routes belonging to different VPNs.

BGP also has an extended community attribute, called Route Target community, used by PE routers to control which VPN routes they accept. Each VPN has a unique Route Target value, and each advertised VPN route in a BGP update message includes a Route Target, indicating to which VPN (or group of customer sites) the VPN route belongs. A given PE router 18 keeps track of those Route Targets associated with the VPNs that the PE router 18 carries, accepting those advertised routes having a matching Route Target and ignoring those that do not.

When advertising a VPN route, a PE router 18 also includes a service demultiplexor (e.g., an MPLS label) in the BGP update message, to identify the VPN route.

Figure 2:
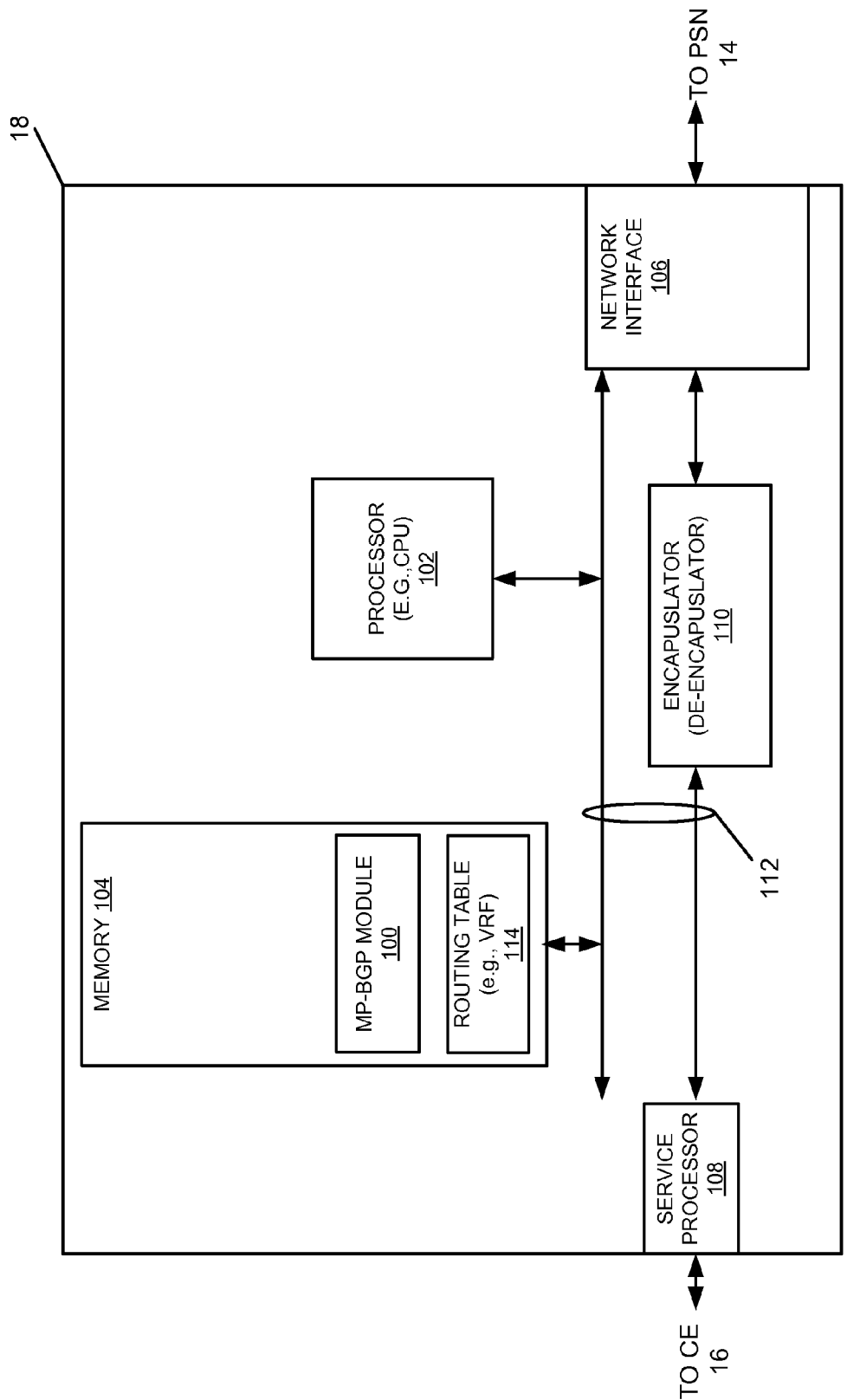
FIG. 2 is a block diagram representation of an embodiment of a PE router.

FIG. 2 shows an oversimplified embodiment of a PE router 18 (e.g., ingress PE router 18-1) including a processor 102, memory 104, a network interface 106, a service processor 108, and an encapsulator/de-encapsulator 110 connected to a system bus 112. The system bus 112 represents generally the various communication paths among the components of the PE router 18, and may in practice be implemented with one or more connected and/or independent signal buses.

In brief overview, the memory 104 includes a MP-BGP module 100 and a routing table 114 (e.g., a Virtual Routing and Forwarding Table or VRF). The processor 102 executes the MP-BGP module 100 for performing auto-discovery, generating BGP update messages, distributing VPN routing information as described herein. The routing table 114 maintains, among other things, a mapping of VPN routes for VPNs and their corresponding Ethernet tunnels. The service processor 108 receives and processes packets from the customer networks 12-1, 12-n in accordance with the type of VPN application of those packets, and delivers the packets to the encapsulator 110. The encapsulator 110 produces an Ethernet frame for transmission by the network interface 106 over the ESP 22 to the egress PE router 18-2. As part of the encapsulation, the ingress PE router 18-1 uses the (foreknown) MAC address (B-DA) of the egress PE router 18-2 at the remote, destination end of the ESP 22.

Figure 5A:
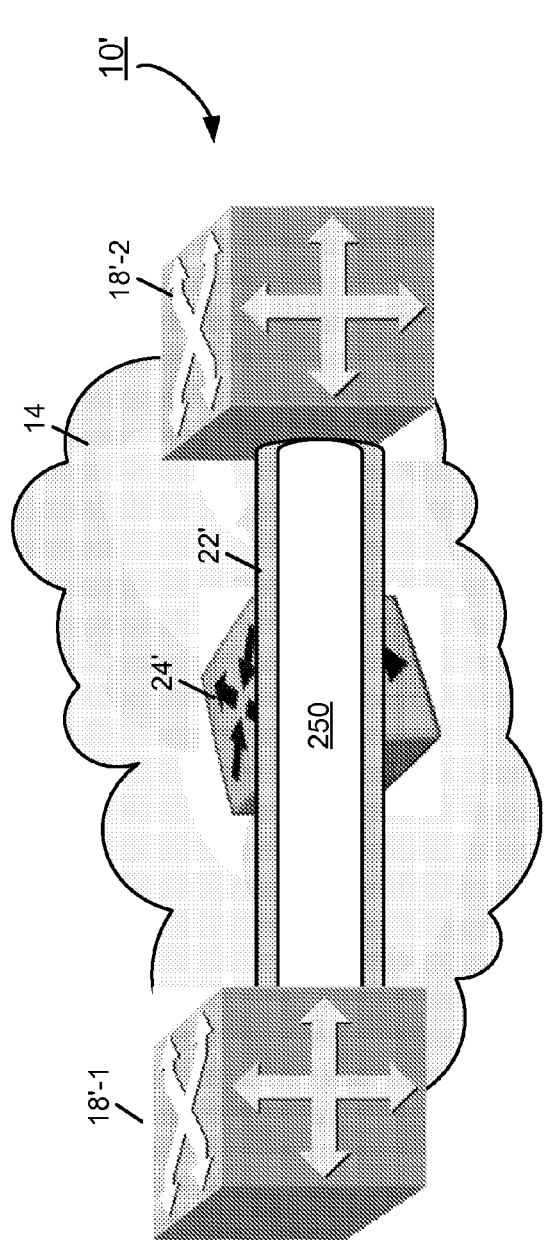
FIG. 5A and FIG. 5B are block diagram representations of other embodiments of communications networks that use Ethernet-based tunnels to support layer-2 and layer-3 BGP-VPN applications.
Figure 5B:
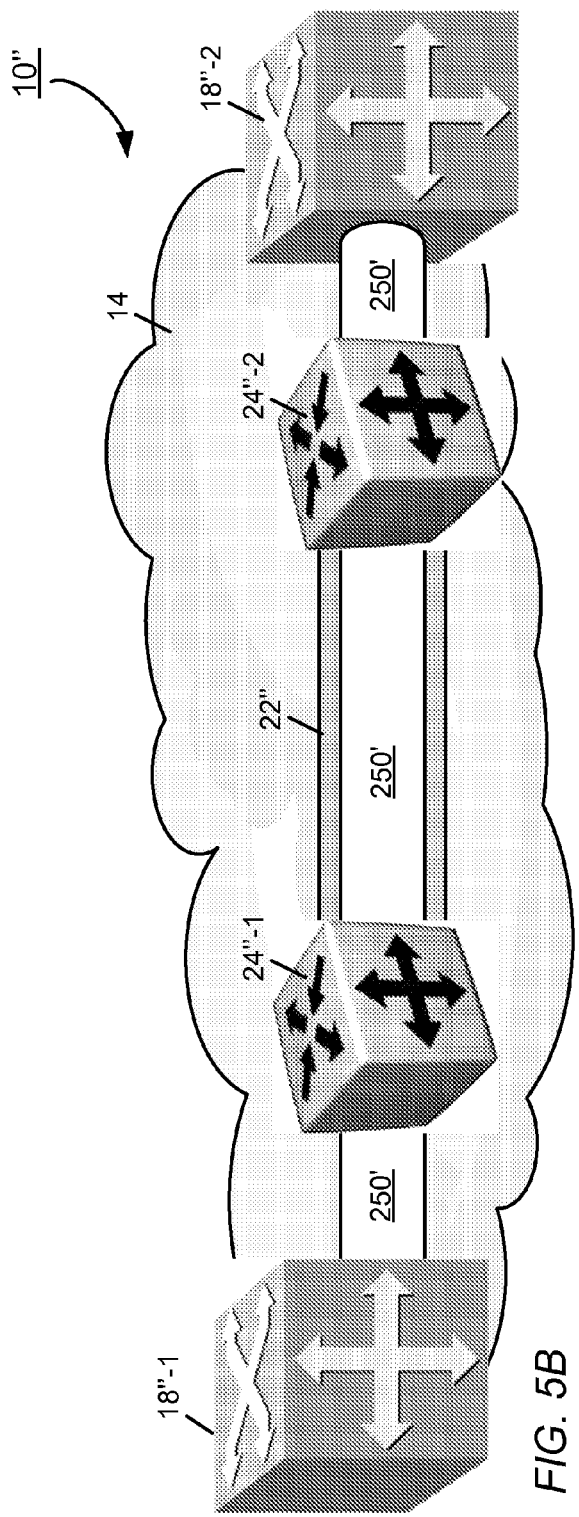

BGP-VPN applications supported by the provider network 14 can be either aware or unaware of the Ethernet tunnels that carry the VPN traffic. In the former instance—that is, the BGP-VPN applications are aware—the Ethernet tunnels are said to be "visible". FIG. 1 illustrates an embodiment in which the Ethernet tunnels are visible. In the latter instance—that is, the BGP-VPN applications are unaware—the Ethernet tunnels are said to be "invisible". FIG. 5A and FIG. 5B illustrate embodiments of communication networks in which the Ethernet tunnels are invisible. Consider, as an example for the following description, that the Ethernet tunnel is a PBT tunnel.

PBT Tunnel-Aware

When a PBT tunnel—here, a representative example of an Ethernet—is visible to BGP-VPN applications, the MP-BGP executing at the PE routers 18 needs to identify the PBT tunnel and associate that PBT tunnel with a set of VPN routing information (corresponding to a given VPN). A set of VPN routing information includes:

(a) a VPN route (for layer-3 VPN applications, such as IP/MPLS VPNs) or a L2VPN address (for layer 2 VPN applications, such as VPLS);
(b) a VPN label (i.e., a service demultiplexor);
(c) address information regarding the PE router at the head end of the PBT tunnel (e.g., a MAC address, a cookie);
(d) a route distinguisher (i.e., a value attached to a route to disambiguate between VPNs); and
(e) route target community information.

Because MP-BGP advertises VPN routes to all PE routers (or to a subset of PE routers), MG-BGP needs to advertise sufficient information so that the PE routers can establish the PBT tunnel. An example of such information can be a MAC address of a PBT tunnel by itself (without the VLAN ID). The receiving PE (e.g., 18-2) uses the MAC address to establish a PBT tunnel to the remote PE (e.g., 18-1) or to reuse an existing, available PBT tunnel leading to the remote PE.

In addition, MP-BGP needs to advertise sufficient information so that the PE routers at each end of PBT tunnel can establish an association between the PBT tunnel and the VPN using that tunnel. Establishing an association between a BGP-VPN and a PBT tunnel—using BGP messages—can occur through direct association or through indirect association. For direct association, the PBT tunnel is visible to the MP-BGP executing at the PE routers 18 (i.e., BGP messages expressly include the association between the PBT tunnel and the VPN).

For indirect association, the BGP messages advertise certain information (e.g., a key, a pointer, an encoding, or a cookie) which receiving PE routers use to decipher the association between a PBT tunnel and a VPN. For example, the advertised cookie can be an IP address of the sending PE router, which the receiving PE maps to one or more PBT tunnels (one-to-one, or one-to-many). In this example, the receiving PE router maintains a database (e.g., a table) of known IP addresses associated with existing PBT tunnels, and uses the cookie (here, an IP address) as a search key or index into the database to identify an associated PBT tunnel. Alternatively, the receiving PE router can use the IP address to establish a PBT tunnel with the sending PE router (depending on or irrespective of whether a PBT tunnel shared with the sending PE router already exists). As another example, the cookie can be a value that the receiving PE router uses to look-up in a database to acquire a MAC address associated of the sending PE router.

An advantage of indirect association is that the sending PE router can select any BGP address field (supported by MP-BGP) to carry the cookie (provided recipient PE routers are aware of which field to access in order to acquire the cookie). Another advantage relates to security: the BGP update message does not expressly identify the PBT tunnel for a given VPN; only recipient PE routers 18 configured to decipher the meaning of the cookie can identify the PBT tunnel. Notably, the use of indirect association is not specifically restricted to advertising routes through Ethernet-based tunnels, but applies to advertising routes in general, for example, MPLS tunnels.

Direct Association

Adapting MP-BGP procedures to support direct association entails changes to the standard usage of the BGP control plane (i.e., the means by which PE routers communicate for auto-discovery and signaling). First, the Next_Hop attribute of the BGP message carries a MAC address (or MAC address with a VLAN ID) of the PE router at the head end of the PBT tunnel.

In addition, another attribute of the BGP update message carries a value used to alert the receiving PE router that the Next_Hop field contains a MAC address, and that this MAC address is to be used for purposes of identifying a PBT tunnel. In one embodiment, this other field is the AFI field. To use the AFI field for signifying that the Next_Hop field contains a PBT-related MAC address, one of two mechanisms can be used: (1) a new type of address family can be defined specifically for signifying a PBT address family; or (2) the existing address family for MAC addresses (an AFI value of 6, as described in RFC 3232) can be reused. Use of the second mechanism presumes that the provider network distributes MAC addresses for purposes of PBT tunnels only.

Irrespective of whether the AFI field carries a value for a newly defined PBT family or for an existing address family type, the NLRI field continues to carry a VPN-IPv4/IPv6 route—which is a departure from standard usage of the BGP address family field in MP-BGP. In addition, the SAFI field continues to carry presently defined SAFI values. (For example, in BGP/MPLS VPNs, the SAFI value is 128 for VPN-IPv4 routes). When the AFI field is used to indicate that the advertisement is for a PBT family (or a MAC address), usage of the Next_Hop field need not be limited to carrying a MAC address (e.g., it can be used to carry a MAC address in combination with a VLAN ID).

Indirect Association

Adapting MP-BGP procedures to support indirect association also entails changes to standard usage of the BGP control plane—different from those implemented for direct association. For indirect association, the BGP Next_Hop field holds the cookie, which can be encoded in an IPv4/IPv6 format or in any format supported by standard-based address families address types (thus, enabling the use of existing defined AFI values). A newly defined SAFI value, for example, can serve to indicate that the Next_Hop is a "cookie" address, and not an address associated with a specific address family. For example, when a PE router receives a BGP update message and determines that the Next_Hop field contains a cookie encoded in an IPv4 format (4 octets)—by reading the SAFI field—the receiving PE router can map the cookie to an available PBT tunnel connected to the sending PE router.

If the cookie is an IPv4 address of the sending PE router—not just in format, but an actual IP address—the receiving PE uses this address to obtain PBT tunnel address. Acquiring this PBT information can be accomplished by any protocol that allows carrying PBT information, an example of which is ARP (Address Resolution Protocol).

Figure 3:
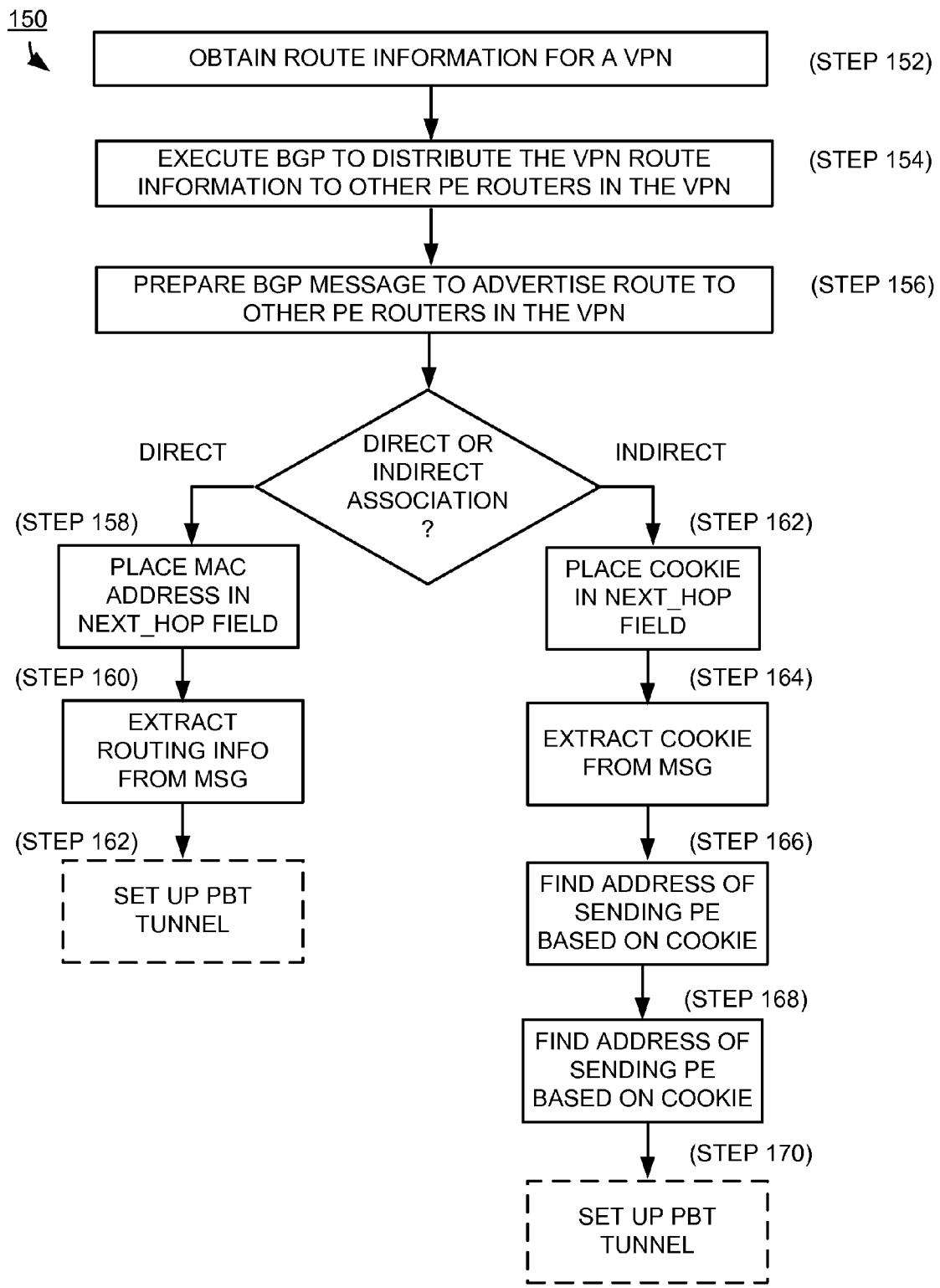
FIG. 3 is a flow diagram of an embodiment of a process for distributing routing information in accordance with the invention.

FIG. 3 shows an embodiment of a process 150 for distributing VPN routing information across the PSN 14 in accordance with the invention. In the description of the process 150, reference is also made to FIG. 1. At step 152, the PE router 18-1 obtains routing information associated with a route for a given VPN (e.g., from CE router 16-1). The PE router 18-1 executes (step 154) the BGP to distribute the VPN route to other PE routers in the VPN. The route is not to be shared with the intermediate P-nodes 24, which base their switching functions on the PBT header.

The PE router 18-1 prepares (step 156) a BGP update message to advertise the VPN route to the other PE routers in the VPN. The content of the BGP update message depends upon whether the message is to provide a direct or an indirect association between the VPN route and a PBT tunnel.

For direct association, the routing information included in the prepared BGP message expressly identifies the association between the VPN route and a PBT tunnel. The sending PE router 18 prepares the NRLI field of the BGP message to include the identity of the VPN route (or L2VPN address), a route distinguisher, a service demultiplexor (e.g., a VPN label), and a route target. The PE router 18 also enters (step 158) its backbone MAC address into the Next_Hop field (i.e., to identify the PBT tunnel), and places a value in the AFI field to indicate that the address in the Next_Hop field is a MAC address to be used for PBT.

A PE router (e.g., 18-2) receiving this BGP update message extracts (step 160) the various routing information, including the MAC address from the Next_Hop field, and determines from the AFI field that the MAC address is for a PBT tunnel. If the PBT tunnel does not yet exist between the sending and receiving PE routers 18-1, 18-2, the receiving PE router 18-2 can use the MAC address of the PE router 18-1 to communicate (step 162) with the sending PE router 18-1 in order to establish it. In FIG. 3, step 162 is shown in dashed lines to indicate that the step may not be performed if one or more PBT tunnels already exist between the PE routers 18. In that instance, the receiving PE router 18-2 uses the MAC address of the sending PE route 18-1 to identify the existing PBT tunnel.

For indirect association, the sending PE router 18 prepares the NRLI field of the BGP message to include—similar to the direct association—the identity of the VPN route (or L2VPN address), a route distinguisher, a service demultiplexor (a VPN label), and a route target. In contrast to direct association, the PE router 18 enters (step 162) a cookie (or encoding) into the Next_Hop field, and places a value in the SAFI field to signify that the value in the Next_Hop field is meant for use as a key in finding an associated PBT tunnel.

The receiving PE router 18-2 extracts (step 164) the various routing information and determines from the SAFI field that the value stored in the Next_Hop field is a cookie. At step 166, the PE router 18-2 uses the cookie to find (e.g., in a look-up table) a MAC address of the sending PE router 18-1. If, based on this MAC address, there are more than one existing PBT tunnel, the recipient PE router 18-2 can make (step 168) a selection and report the selection to the sending PE router. Alternatively, if a PBT tunnel between the PE routers does not yet exist, the recipient PE router 18-2 can communicate (step 170) with the sending PE router 18-1 to establish it (provided the BGP message carried the IP address of the PE router 18-1, via the cookie in the Next_Hop field, which can point to the PBT tunnel).

After auto-discovery and association of a VPN with a PBT tunnel, the ingress PE router 18-1 can process packets of the VPN application from a customer network (e.g., 12-1). The ingress PE router 18-1 encapsulates each received packet within an Ethernet frame (i.e., a PBT header) and forwards the encapsulated packets to the egress PE router 18-2 through the PBT tunnel. Upon receiving the packets over the PBT tunnel, the egress PE router 18-2 de-encapsulates the packet from the Ethernet frame for forwarding to a destination customer network (not shown in FIG. 1). It is to be understood that the roles of the PE routers 18-1, 18-2 reverse when transporting VPN traffic in the opposite direction over the PBT tunnel. That is, the egress PE router 18-2 operates as a packet-encapsulating ingress PE router and the ingress PE router 18-1 operates as a packet-de-encapsulating egress device.

Figure 4:
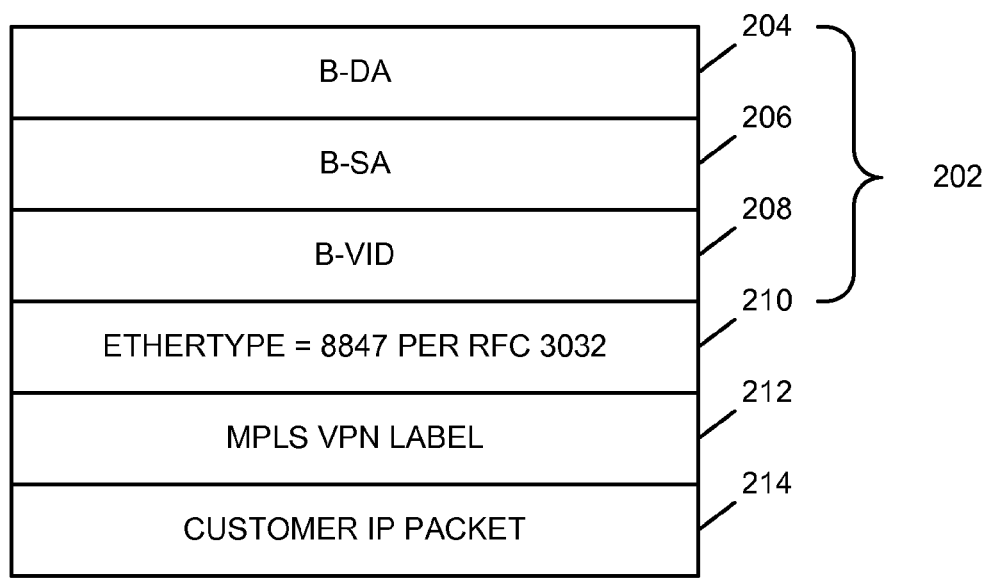
FIG. 4 is a representation of a frame format for VPN data traffic transmitted through an Ethernet-based tunnel.

FIG. 4 shows a general frame format for the VPN data packet 200 after encapsulation with a PBT header 202. The PBT header 202 includes a backbone destination address (B-DA) 204, a backbone source address (B-SA) 206, a backbone VLAN-ID (B-VID) 208, an Ethertype 210 (here indicating that the VPN data packet contains a unicast MPLS packet), a MPLS VPN label (service demultiplexor) 212, and the customer IP packet 214. The encapsulation of MPLS packets in an Ethernet frame for tunneling through an ESP is described in more detail in U.S. patent application Ser. No. 11/761,339, filed Jun. 11, 2007, the entirety of which is incorporated by reference herein.

PBT Tunnel-Unaware BGP-VPN Applications

Some BGP-VPN applications are unaware of the PBT tunnels used to support the VPN traffic across the service provider PSN 14. Depending upon the particular BGP-VPN application, VPN packets arrive at an ingress PE router encapsulated for transmission using a different tunneling mechanism other than PBT. Examples of such tunneling mechanisms include, but are not limited to, MPLS-in-MPLS, MPLS-in-IP, MPLS-in-GRE. Supporting such BGP-VPN applications for transport over a PBT tunnel does not require any modifications to the MP-BGP procedures executing at the PE routers; auto-discovery occurs in accordance with standard BGP mechanisms, for example, as described in RFC 4364, titled "BGP/MPLS IP Virtual Private Networks (VPNs) ". In general, the provider PSN 14 includes a node that further encapsulates the BGP-VPN application with a PBT header, in effect creating a tunnel within a tunnel. For example, the transmission of an MPLS-in-IP BGP-VPN application through a PBT tunnel produces MPLS-in-IP-in-PBT.

FIG. 5A and FIG. 5B shows two exemplary communications networks 10' and 10", respectively, that illustrate PBT tunnel-unaware BGP-VPN applications. In FIG. 5A, VPN data packets arrive at an ingress PE router 18-1 encapsulated in an intermediate tunnel 250 (e.g., IP, MPLS, GRE). The PE router 18'-1 includes VPN software for processing the VPN data packets and PBT software for encapsulating the VPN data packets in a PBT header for transmission over the PBT tunnel 22'. To determine the particular PBT tunnel through which to send the VPN data traffic, the PE router 18-1 can use a table to map the header of the intermediate tunnel 250 to a PBT tunnel.

In FIG. 5B, the mapping of the header of an intermediate tunnel 250' to a PBT tunnel occurs at an intermediate P-node 24"-1. An ingress PE router 18"-1 receives VPN packets encapsulated with a header in accordance with the intermediate tunnel 250' (e.g., IP, MPLS) and forwards those packets to the intermediate P-node 24"-1—using the intermediate tunnel 250'. The P-node 24"-1 then maps the VPN data packets to a PBT tunnel, encapsulates the packets in an PBT header appropriate for the PBT tunnel, and forwards the encapsulated (tunnel-in-a-tunnel) VPN data packets to a second P-node 24"-2.

Program code (or software) of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of distributing routing information for a virtual private network (VPN) application through a packet-switched network (PSN) from a first provider edge (PE) router to a second provider edge (PE) router, the method comprising:

establishing an Ethernet switched path between the first and second PE routers, the first PE router being at a source end of the Ethernet switched path and the second PE router being at a destination end of the Ethernet switched path;

sending a BGP (Border Gateway Protocol) message from the first PE router to the second PE router, the BGP message containing routing information for a VPN route in a VPN supported by the PSN; and determining from the routing information in the BGP message an association between the VPN route in the VPN and the Ethernet switched path.

2. The method of claim 1, wherein the Ethernet switched path is a PBT (Provider Backbone Transport) tunnel.

3. The method of claim 1, wherein the routing information includes a MAC (Media Access Control) address of the first PE router at the source end of the Ethernet switched path.

4. The method of claim 3, wherein a Next_Hop field of the BGP message carries the MAC address of the first PE router; and wherein another field of the BGP message has a value that indicates the Next_Hop field is carrying a MAC address of the first PE router at the source end of the Ethernet switched path.

5. The method of claim 4, wherein the other field of the BGP message is an AFI (address family indicator) field.

6. The method of claim 1, wherein the routing information includes an encoding, and further comprising the step of determining, by the second PE router, the Ethernet switched path associated with the VPN route based on the encoding.

7. The method of claim 6, wherein a Next_Hop field in the BGP message carries the encoding and a SAFI (subsequent address family indicator) field in the BGP message carries a value that indicates the Next_Hop field is carrying the encoding.

8. The method of claim 1, wherein the Ethernet switched path is a point-to-multipoint tunnel between the first PE router and a plurality of other PE routers.

9. A packet-switched network comprising first and second provider edge (PE) routers in communication with each other over an Ethernet switched path, each PE router running a Border Gateway Protocol (BGP) as a discovery mechanism in support of a virtual private network (VPN) application to be transported over the Ethernet switched path, the first PE router transmitting routing information to the second PE router in a BGP message, the second PE router determining from the routing information in the BGP message an association between a VPN route for the VPN application and the Ethernet switched path.

10. The network of claim 9, wherein the Ethernet switched path is a PBT (Provider Backbone Transport) tunnel.

11. The network of claim 9, wherein the routing information includes a MAC (Media Access Control) address of the first PE router at the source end of the Ethernet switched path.

12. The network of claim 11, wherein a Next_Hop field of the BGP message carries the MAC address of the first PE router; and wherein another field of the BGP message has a value that indicates the Next_Hop field is carrying a MAC address of the first PE router at the source end of the Ethernet switched path.

13. The network of claim 12, wherein the other field of the BGP message is an AFI (address family indicator) field.

14. The network of claim 9, wherein the routing information includes an encoding, and wherein the second PE router determines the Ethernet switched path associated with the VPN route based on the encoding.

15. The network of claim 14, wherein a Next_Hop field in the BGP message carries the encoding and a SAFI (subsequent address family indicator) field in the BGP message carries a value that indicates the Next_Hop field is carrying the encoding.

16. The network of claim 9, wherein the Ethernet switched path is a point-to-multipoint tunnel between the first PE router and a plurality of other PE routers.

17. A border gateway protocol (BGP) network device in communication with a BGP peer over a packet-switched network through an Ethernet switched path, the BGP network device comprising:

memory storing routing information for supporting a virtual private network (VPN) application over the Ethernet switched path and program code with computer-readable instructions for sending BGP messages with the routing information to the BGP peer; and a processor executing the program code to generate a BGP message with the routing information for transmitting to the BGP peer, the routing information in the BGP message providing an association between a VPN route for the VPN application and the Ethernet switched path.

18. The BGP network device of claim 17, wherein the Ethernet switched path is a PBT (Provider Backbone Transport) tunnel.

19. The BGP network device of claim 17, wherein the routing information includes a MAC (Media Access Control) address of the BGP network device.

20. The BGP network device of claim 19, wherein a Next_Hop field of the BGP message carries the MAC address; and wherein another field of the BGP message has a value that indicates the Next_Hop field is carrying a MAC address associated with the Ethernet switched path.

21. The BGP network device of claim 20, wherein the other field of the BGP message is an AFI (address family indicator) field.

22. The BGP network device of claim 17, wherein the routing information includes an encoding used by a recipient of the BGP message to identify the Ethernet switched path.

23. The BGP network device of claim 22, wherein a Next_Hop field in the BGP message carries the encoding and a SAFI (subsequent address family indicator) field in the BGP message carries a value that indicates the Next_Hop field is carrying the encoding.

24. The BGP network device of claim 17, wherein the Ethernet switched path is a point-to-multipoint tunnel between the first PE router and a plurality of other PE routers.

* * * * *